United States Patent
Wahl et al.

(10) Patent No.: US 11,053,934 B2
(45) Date of Patent: Jul. 6, 2021

(54) CRYOGENIC VIBRATION SENSOR AND INSULATOR PAD ASSEMBLY, AND CRYOGENIC PUMPS INCLUDING THE SAME

(71) Applicant: NIKKISO CRYO INC., North Las Vegas, NV (US)

(72) Inventors: Fabien Wahl, Las Vegas, NV (US); Ruben Rodriguez, North Las Vegas, NV (US); John Rupert, North Las Vegas, NV (US)

(73) Assignee: NIKKISO CRYO INC., North Las Vegas, NV (US)

( * ) Notice: Subject to any disclaimer, the term of this patent is extended or adjusted under 35 U.S.C. 154(b) by 169 days.

(21) Appl. No.: 16/239,350

(22) Filed: Jan. 3, 2019

(65) Prior Publication Data

US 2019/0137327 A1    May 9, 2019

Related U.S. Application Data

(62) Division of application No. 14/755,472, filed on Jun. 30, 2015, now Pat. No. 10,175,092.

(51) Int. Cl.

| F04B 51/00 | (2006.01) |
|---|---|
| F04B 15/08 | (2006.01) |
| F04D 7/00 | (2006.01) |
| F04D 15/00 | (2006.01) |
| G01H 1/00 | (2006.01) |

(52) U.S. Cl.
CPC .............. *F04B 51/00* (2013.01); *F04B 15/08* (2013.01); *F04D 7/00* (2013.01); *F04D 15/0088* (2013.01); *F05D 2270/807* (2013.01); *G01H 1/003* (2013.01)

(58) Field of Classification Search
CPC ........ F04D 15/0088; F04D 7/00; F04B 15/08; F04B 51/00
See application file for complete search history.

(56) References Cited

U.S. PATENT DOCUMENTS

| 2002/0094277 A1* | 7/2002 | Gaudet | ................... F04B 37/08 417/44.1 |
|---|---|---|---|
| 2004/0037721 A1* | 2/2004 | Haesloop | ................. F04D 13/08 417/423.15 |

(Continued)

FOREIGN PATENT DOCUMENTS

| JP | 48076688 U | 9/1973 |
|---|---|---|
| JP | S56113881 A | 9/1981 |

(Continued)

OTHER PUBLICATIONS

CCLD Accelerometer Types 4507 and 4508, Bruel and Kjaer, Dec. 2012.*

(Continued)

*Primary Examiner* — Woody A Lee, Jr.
(74) *Attorney, Agent, or Firm* — Cantor Colburn LLP (57) ABSTRACT

A cryogenic-rated vibration sensor generally includes a cryogenic-rated accelerometer mounted to a top planar surface of an insulation block, wherein the insulation block includes a threaded opening on a bottom planar surface thereof for attachment to an object. Also disclosed are cryogenic pumps including the cryogenic-rated vibration sensor.

7 Claims, 6 Drawing Sheets

(56) References Cited

U.S. PATENT DOCUMENTS

2006/0123904 A1* 6/2006 Dwyer .................. G01P 1/00
                                                    73/493
2015/0159921 A1* 6/2015 Lee .................... B01D 8/00
                                                    62/6

FOREIGN PATENT DOCUMENTS

| | | |
|---|---|---|
| JP | 03140875 A | 6/1991 |
| JP | H09178545 A | 7/1997 |
| JP | 2005274163 A | 10/2005 |
| JP | 2006519328 A | 8/2006 |
| JP | 2012220461 A | 11/2012 |
| JP | 6208023 B2 | 10/2017 |
| WO | 2004001226 A3 | 12/2003 |

OTHER PUBLICATIONS

Product Data Piezoelectric DeltaShear Accelerometers, Bruel and Kjaer, Feb. 2007.*

Kistler Catalogue, Kistler, Nov. 2008.*

Screenshot of archived Kistler Catalogue, https://web.archive.org/web/20081119082449/https://intertechnology.com/Kistler/pdfs/Accelerometer_Model_8702B_8704B.pdf, showing date of Nov. 2008.*

CCLD Accelerometer Types 4507 and 4508, Burel and Kjaer, Dec. 2012.

Kistler Catalogue, Kisler, Nov. 2008.

Rush, et al.; "Tutorial on Cryogenic Submerged Electric Motor Pumps," Proceedings of the 18th International Pump Users Symposium; pp. 101-107, (2001).

Sceenshot of archived Kistler Catalogue, https://web.archive.org/web20081119082449/https://intertechnology.com/Kistler/pdfs/Accelerometer_Model_8702B_8704B.pdf,showing date of Nov. 2008.

English Translation of Notice of Reasons for Refusal issued in JP Application No. 2016-127524 dated May 26, 2020; 5 pages.

Office Action for Japanese Application No. 2016-127524 dated Feb. 16, 2021, 2 pages.

* cited by examiner

CRYOGENIC VIBRATION SENSOR AND INSULATOR PAD ASSEMBLY, AND CRYOGENIC PUMPS INCLUDING THE SAME

DOMESTIC PRIORITY

This application is a DIVISIONAL of U.S. application Ser. No. 14/755,472, Jun. 30, 2015, the contents of which are incorporated by reference herein in its entirety.

BACKGROUND

The present disclosure relates to vibration sensors for cryogenic pumps and cryogenic pumps including the same.

Cryogenic pumps are centrifugal pumps designed specifically for handling cryogenic fluids such as liquid natural gas (LNG), liquid petroleum gas (LPG), liquid ethylene, propylene, ethane, and like cold fluids. These pumps are oftentimes submersible and made to operate under extreme conditions compared to other process industries. For example, one of the more critical pieces of equipment in a liquid natural gas (LNG) terminal are the LNG pumps, which operates under cryogenic conditions of −161° C.

Depending on the particular application, these types of pumps may be of substantial size with typical column lengths of about 15 to about 20 feet (about 4.5 to about 6 meters) or more, and column diameters ranging up to about 3 feet (about 1 meter) or more. The pump is thus made up of several major components, each of which may weigh several hundred pounds, wherein the total weight of the pump can be in excess of about 10,000 to about 15,000 pounds (about 4,500 to about 6,800 kilograms) or more.

Although the cryogenic pump is considered to be a quite reliable since the pump is normally installed in a clean, non-corrosive environment and is not exposed to the atmosphere, preventive maintenance of cryogenic pumps is often practiced since most cryogenic fluids have very high containment requirements to avoid gas leaks to the atmosphere or spills. Many pumps are now supplied with vibration detection systems. These systems are normally in the form of an accelerometer mounted directly to the pump housings with the instrument cable going up and out of the vessel or tank in much the same way as the power cables. These systems can provide a vibration level for normal operation and can provide alarms if vibration levels exceed an alert set point. The vibration systems can also be a valuable tool for trouble shooting, by allowing spectrum analysis of the vibration, which can be used to identify faults or impending failure.

However, working in a cryogenic environment presents difficulties since many pump designs result in the vibration sensor being in exposed to the cryogenic conditions or in some cases parallel to the power cables feeding the pump motors contact with the flowing cryogenic liquid. Applicant has discovered that saturation of the accelerometer signal produced by the vibration sensor can occur leading to inaccurate monitoring even when employing a cryogenic-rated accelerometer.

BRIEF SUMMARY

These and other problems and deficiencies of the prior art are overcome by providing a cryogenic pump including a suction pot including an inlet at a lower portion; a head plate attached to a top of the suction port, wherein the cap includes a discharge outlet; a centrifugal pump comprising a vertically oriented pump shaft disposed within the suction pot and suspended from the cap, wherein the pump is configured to move a cryogenic fluid through the inlet to the discharge outlet; and at least one vibration sensor mounted to a least one component of the cryogenic pump, wherein the at least one vibration sensor comprises an insulation block having a bottom surface in direct contact with the at least component and an accelerometer coupled to a top surface of the insulation block and free from direct contact with the at least one pump component.

The cryogenic-rated vibration sensor includes a cryogenic-rated accelerometer mounted to a top planar surface of an insulation block, wherein the insulation block includes a threaded opening on a bottom planar surface thereof for attachment to an object.

The above described and other features are exemplified by the following figures and detailed description.

BRIEF DESCRIPTION OF THE SEVERAL VIEWS OF THE DRAWINGS

These and other features will be described below with reference to the following figures, in which.

FIG. ("FIG.") 1 shows a side perspective view of an exemplary cryogenic pump in accordance with the present disclosure.

DETAILED DESCRIPTION

The present disclosure is generally directed to a vibration sensor configured for use with a cryogenic pump, wherein the sensor is attached to a pump component of the cryogenic pump. As will be described in greater detail below, the vibration sensor generally includes a cryogenic-rated accelerometer attached to an insulator block, wherein the insulator block is configured for attachment to the surface of a desired pump component. The vibration sensor in accordance with the present disclosure can be attached to any cryogenic pump surface undergoing rapid cool-down to cryogenic temperatures and be used to provide accurate measurements. For example, after pumping cryogenic fluid such as liquefied hydrogen, liquefied nitrogen, liquefied natural gas, or other cryogenic fluids having a temperature of between 0° K to 125° K or more, some of the pump components and surfaces thereof will be significantly chilled, wherein the vibration sensor can be attached to the surface to monitor the pump vibrations during use and provide alarms if the vibration levels exceed an alert set point.

Figure 1:
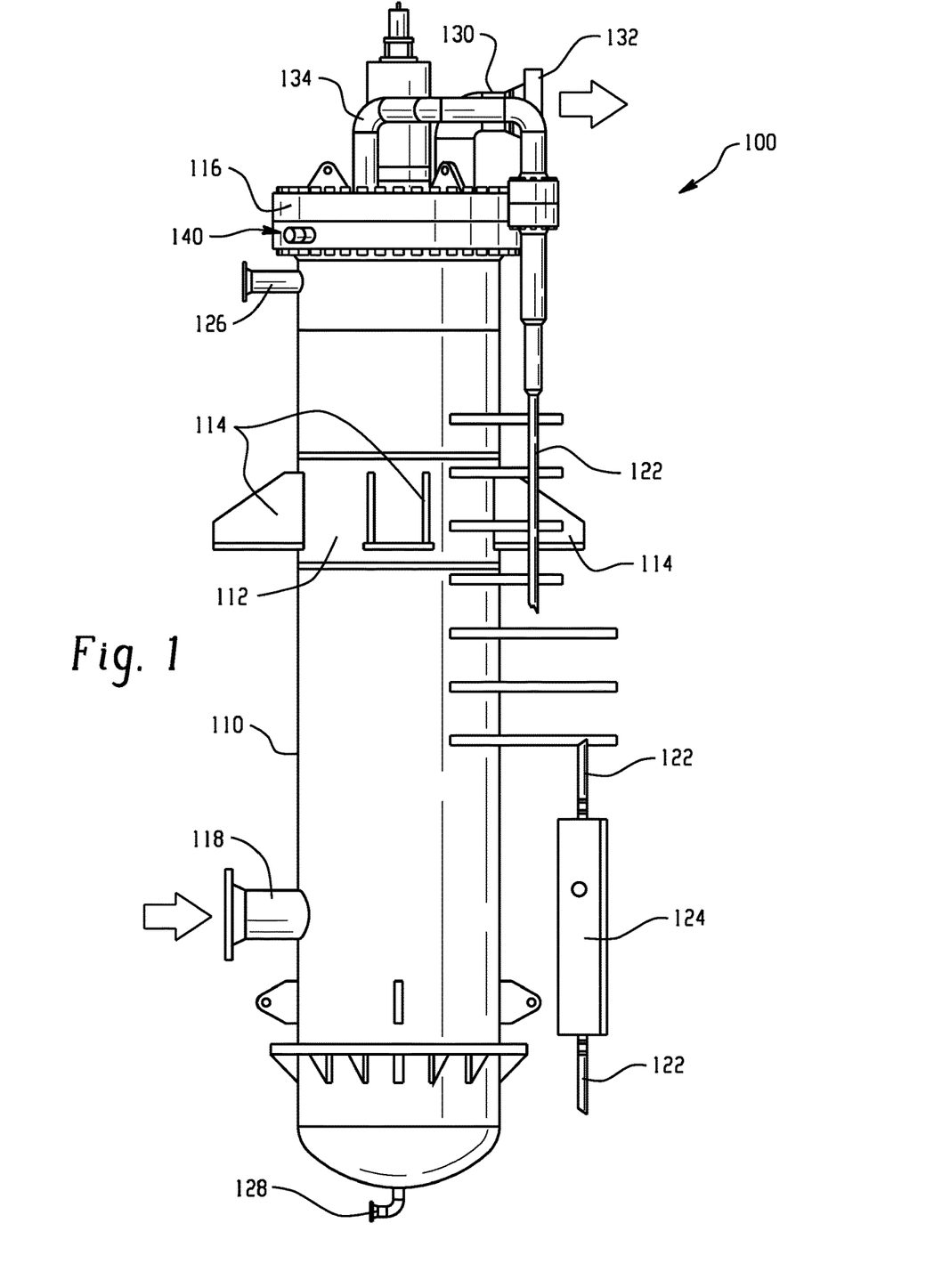
Figure 2:
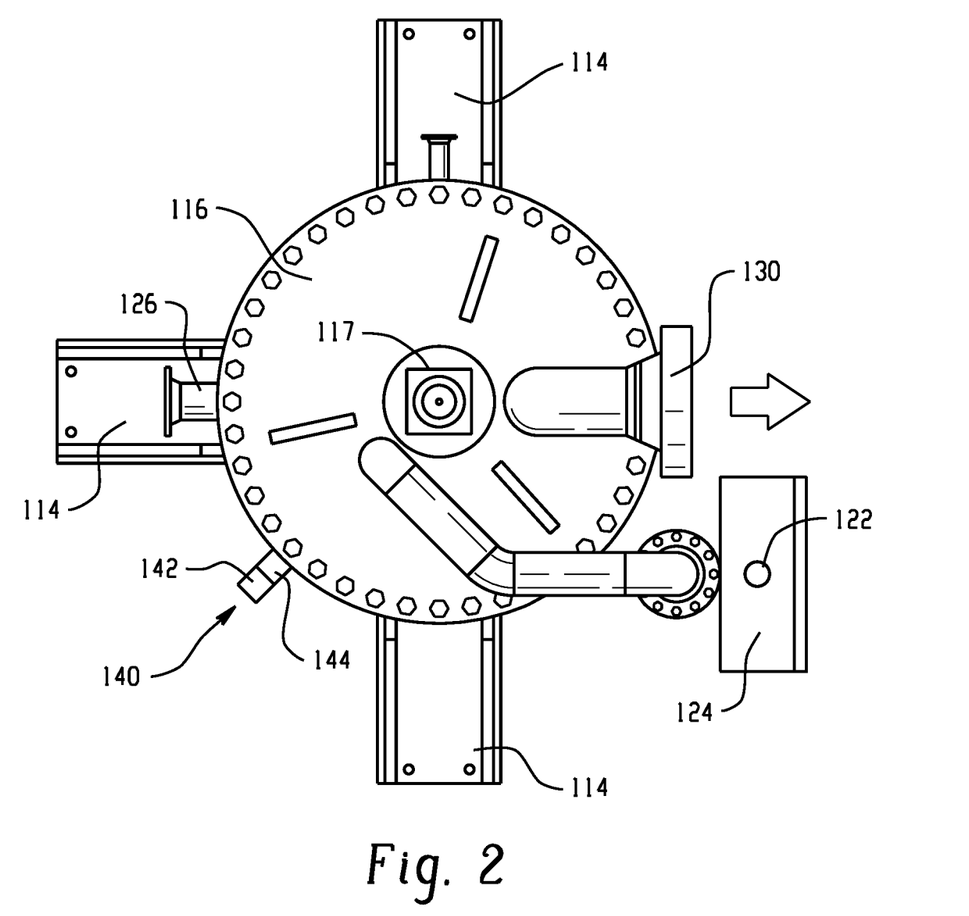
FIG. 2 depicts a top down view of the exemplary cryogenic pump of FIG. 1.

Referring now to FIGS. 1 and 2, there is depicted an exemplary cryogenic pump 100. The exemplary cryogenic pump including the vibration sensor is not intended to be limited to any particular type and/or configuration. By way of example, the cryogenic pump may be of a submersible-type, long shaft-type, vacuum housing-type, and the like, and commonly found in the production and transport of liquid natural gas (LNG), liquid nitrogen, liquid helium, and the like. As will be described herein, the vibration sensor in accordance with the present disclosure can be mounted to any surface of the cryogenic pump that undergoes rapid-cooling when pumping a cryogenic fluid, wherein the vibration sensor accurately measures vibration during operation thereof even when the surfaces reach cryogenic temperatures, i.e., temperatures less than 125 K. In most embodiments, the vibration sensor will be disposed on a surface generally parallel to the axial rotation of the pump shaft as will be described below.

The exemplary cryogenic pump 100 includes a suction pot 110 primarily supported by support ring 112 and support arms 114. Attached to the top of suction pot 110 is a cap 116 (also referred herein as the head plate) from which a centrifugal pump (not shown) is suspended within the suction pot 110. Most centrifugal suction pumps generally include a vertically suspended pump shaft, which carries at least one set of vanes, which pumps the fluid by centripetal force in a known manner. During operation, inlet nozzle 118 is submerged into a liquid to be pumped or is fed pressurized liquid from one more feeder pumps (not shown), which then passes through one or more sets of the vanes (or impellers), wherein each set of vanes constitutes a stage. At the top of the pumping chambers is an exhaust conduit 130, which passes the fluid to an exhaust outlet 132. In this manner, fluid enters from the bottom 118 of the suction pot 110 and is discharged at an upper portion of the suction pot 110 via the exhaust conduit 130. The pump shaft is driven by an electric motor to provide movement of the sets of vanes during operation. Power to the electric motor is provided by power cables fed through a conduit 122, which may include a breaker panel 124.

The illustrated cryogenic pump 100 may further include additional vents and nozzles such as a seal vent port 134, a vent nozzle 126, a fill/drain nozzle 128, upper and lower liquid level nozzles, various purge ports, and the like. The illustrated pump may further include additional vibration sensors without the insulation block, which can be externally and/or internally positioned about the cryogenic pump.

A vibration sensor 140 in accordance with the present disclosure is shown coupled to the head plate 116 of the suction pot 110 and is utilized for detecting abnormal vibrations that could indicate a bearing failure or other malfunction associated with the cryogenic pump. Although the vibration sensor is shown coupled to the head plate, other locations are contemplated, e.g., the suction pot, the pump casing, the bearing housing, and the like. Generally, it is preferred to provide a location that is relatively accessible in the event repairs are needed, and/or at a location in close proximity to detect vibrations. The vibration sensor 140 includes a cryogenic-rated accelerometer 142 and an insulation block 144 intermediate the accelerometer and the cap surface as previously described. The insulator block can be attached to the cap surface using a stud and to the accelerometer with a second stud. Alternatively, an adhesive can be used. The cryogenic-rated accelerometer is a sensor, or transducer, which is designed to generate an electrical signal in response to acceleration (or deceleration) that is applied perpendicular to the pump axis. Suitable cryogenic rated accelerometers are piezoelectric-based sensors commercially available under models series 351 from PCB Piezotronics, Inc.

The insulating block is not intended to be limited to any particular material so long as the material is stable under cryogenic conditions. By way of example, the insulating block can be made of polytetrafluoroethylene, ultra-high molecular weight polyethylene, various thermoset plastic industrial laminates, G10 FR4 Glass epoxy, and the like. The thickness of the insulating block is generally greater than 0.1 millimeter. The thickness is generally not limited so long as a signal can be detected. The insulating block is not intended to be limited to any particular shape and can be cylindrical, rectangular, or the like. Generally, the insulating block has a planar top and bottom surfaces to conform to the corresponding attachment surfaces of the accelerometer and the pump component. The dimensions are generally equal to or larger than the surface defining the point of attachment of the accelerometer to the insulating block. The dielectric constant is at least 800 V/mil.

The thermoset plastic industrial laminates typically have a layered construction with no fewer than two components. The first component is a reinforcing substrate such as woven glass cloth, random glass mat, glass filaments, woven canvas cotton fabric, woven linen cotton fabric, paper, woven aramid fabric, random mat aramid, woven graphite fabric, random mat graphite and others. The second component is a thermoset plastic resin binder which serves to adhere the layers of reinforcing substrates to each other to form a solid unit. Resin binders include epoxies, melamines, phenolics, polyesters, silicones and others. By way of example, a suitable thermoset plastic laminate is a NEMA grade G10 and FR4 glass-cloth reinforced epoxy. Representatively, the accelerometer portion 142 is a model series 351 quartz shear-structured cryogenic rated accelerometer sold by PCB Piezotronics, Inc., 3425 Walden Avenue, Depew, N.Y. 14043.

Example

In this example, vibration was measured on a calibrated shaker and a cryogenic pump using a cryogenic rated accelerometer with and without the presence of the insulation block. The accelerometer was a ground isolated, cryogenic, quartz shear ICP® accelerometer, 100 mV/g, 1 to 2 k Hz, 10-32 side connector (−320 to +250→F/−196 to +121→C), commercially available under the model number J351B41 from PCB Piezotronics, Inc. The insulation block was a cylindrical block made of G10-FR4, a continuous woven glass fabric laminated with an epoxy resin, having a height of 1.25 inch and a diameter of 1.25 inch. The insulation block included two threaded holes to accommodate two studs: one between the block and stud on the calibrated shaker or cryogenic pump and one between the block and accelerometer. With regard to attachment to the cryogenic pump, the vibration sensor was attached to the cap in a location similar to that shown in FIGS. 1 and 2. The cryogenic pump was a 13-stage high pressure submerged motor pump for liquid natural gas service and suction pot mounted, which is commercially available from Nikkiso Cryo, Inc.

Figure 3:
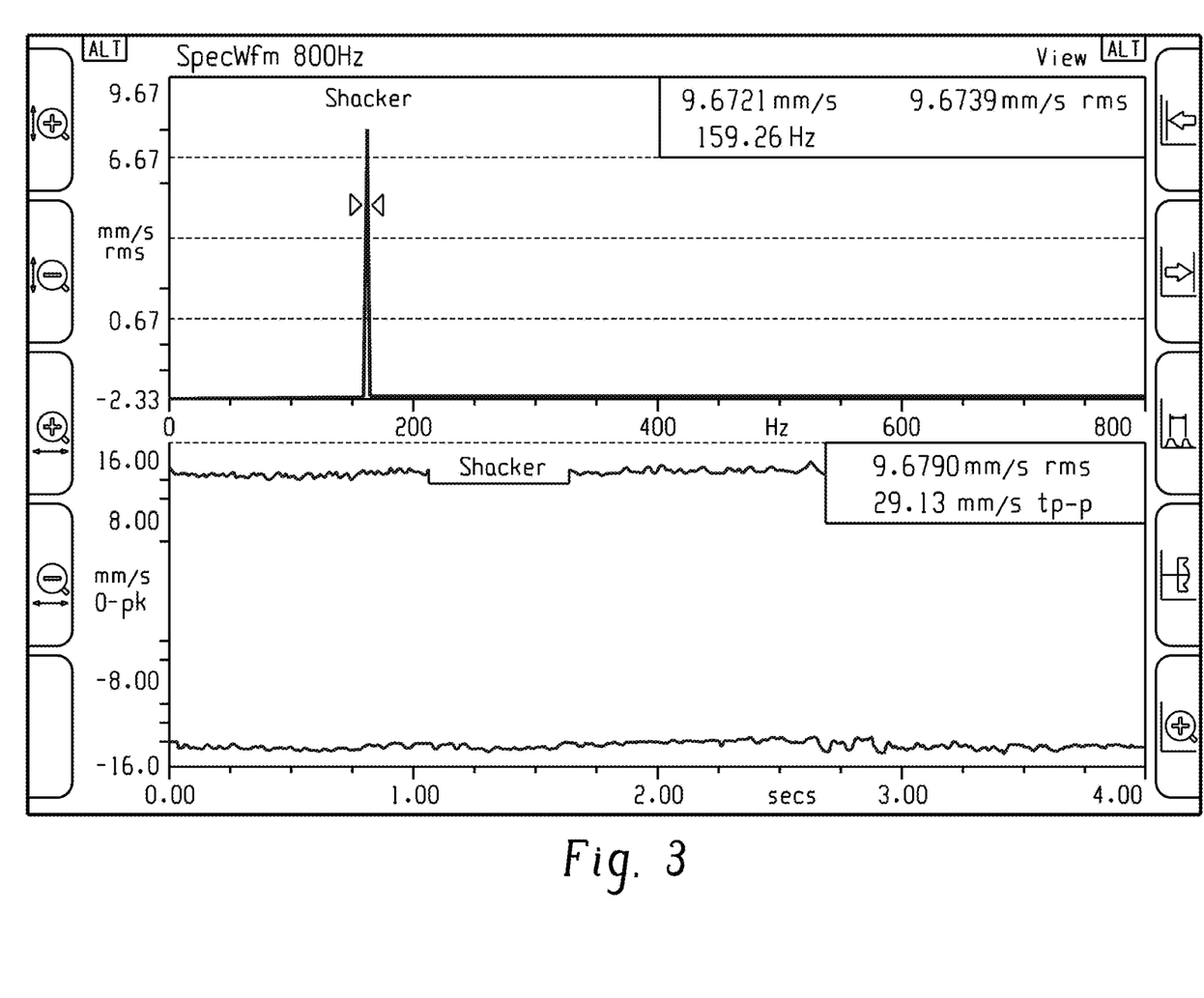
FIG. 3 graphically illustrates rms velocity as a function of frequency and time for an accelerometer mounted directly to a surface of a calibrated shaker.
Figure 4:
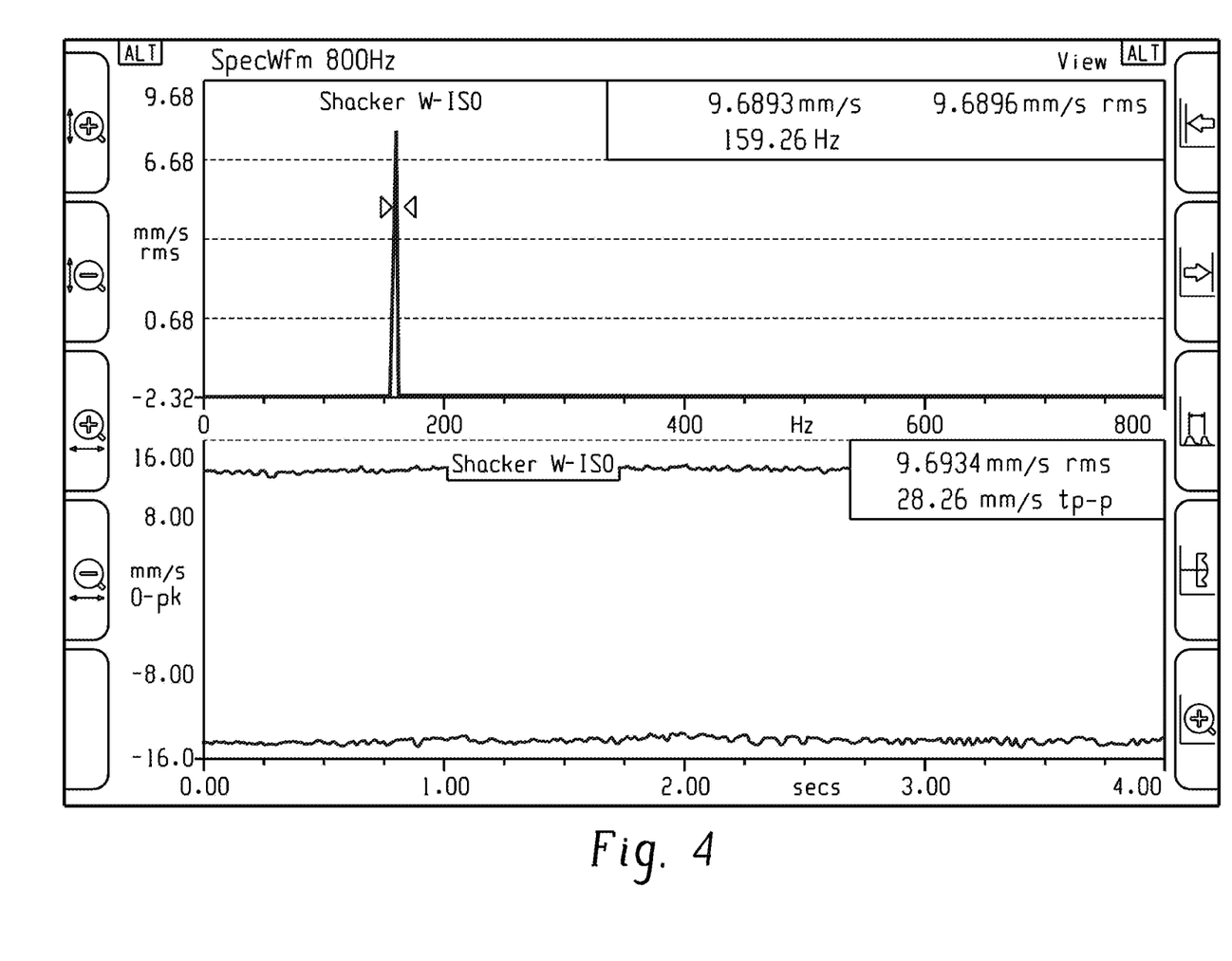
FIG. 4 graphically illustrates rms velocity as a function of frequency and time for the accelerometer mounted directly to the surface of the calibrated shaker of FIG. 4, wherein an insulating block is positioned between the accelerometer and the surface.
Figure 5:
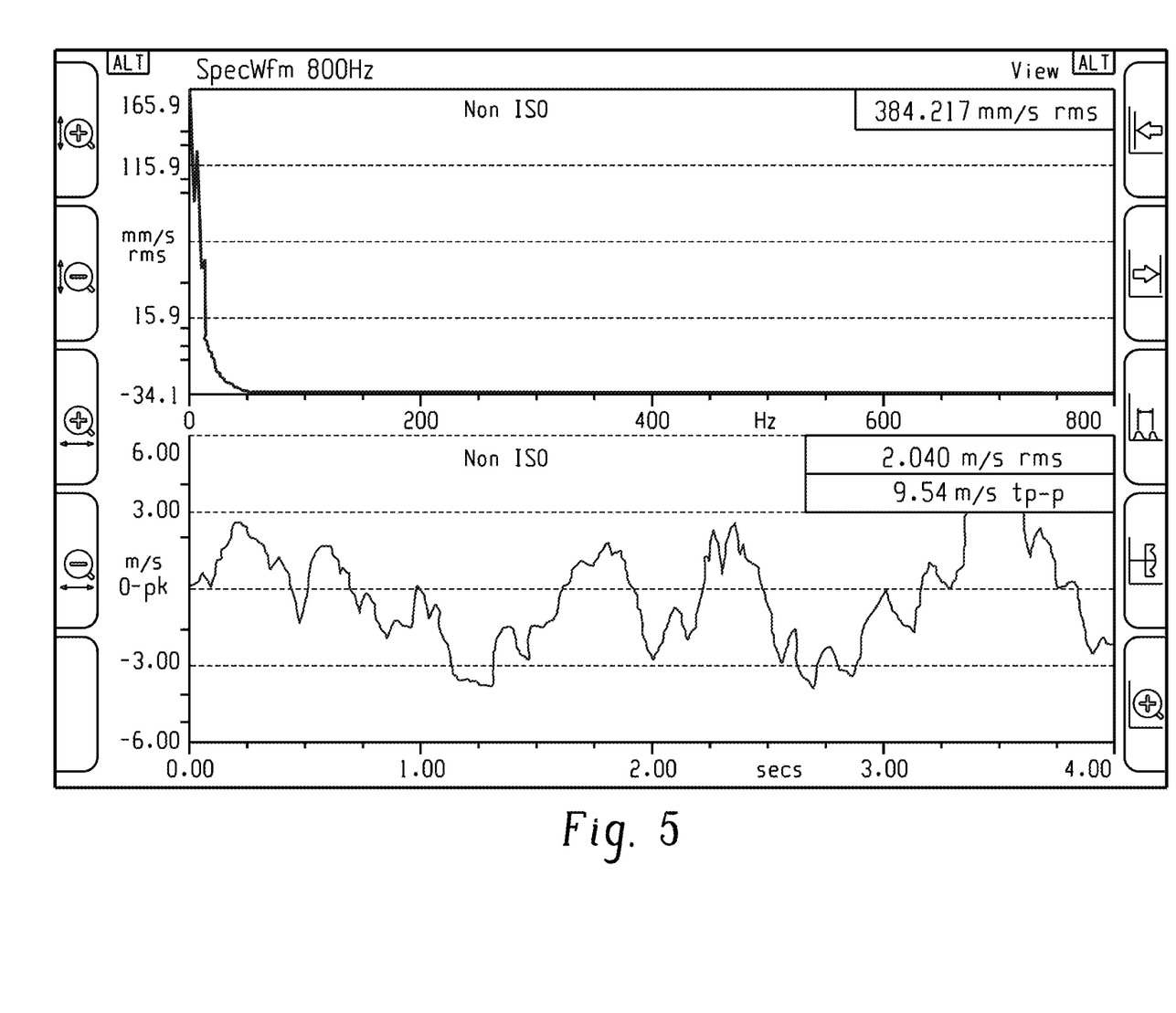
FIG. 5 graphically illustrates rms velocity as a function of frequency and time for an accelerometer mounted directly to a surface of a cryogenic pump.
Figure 6:
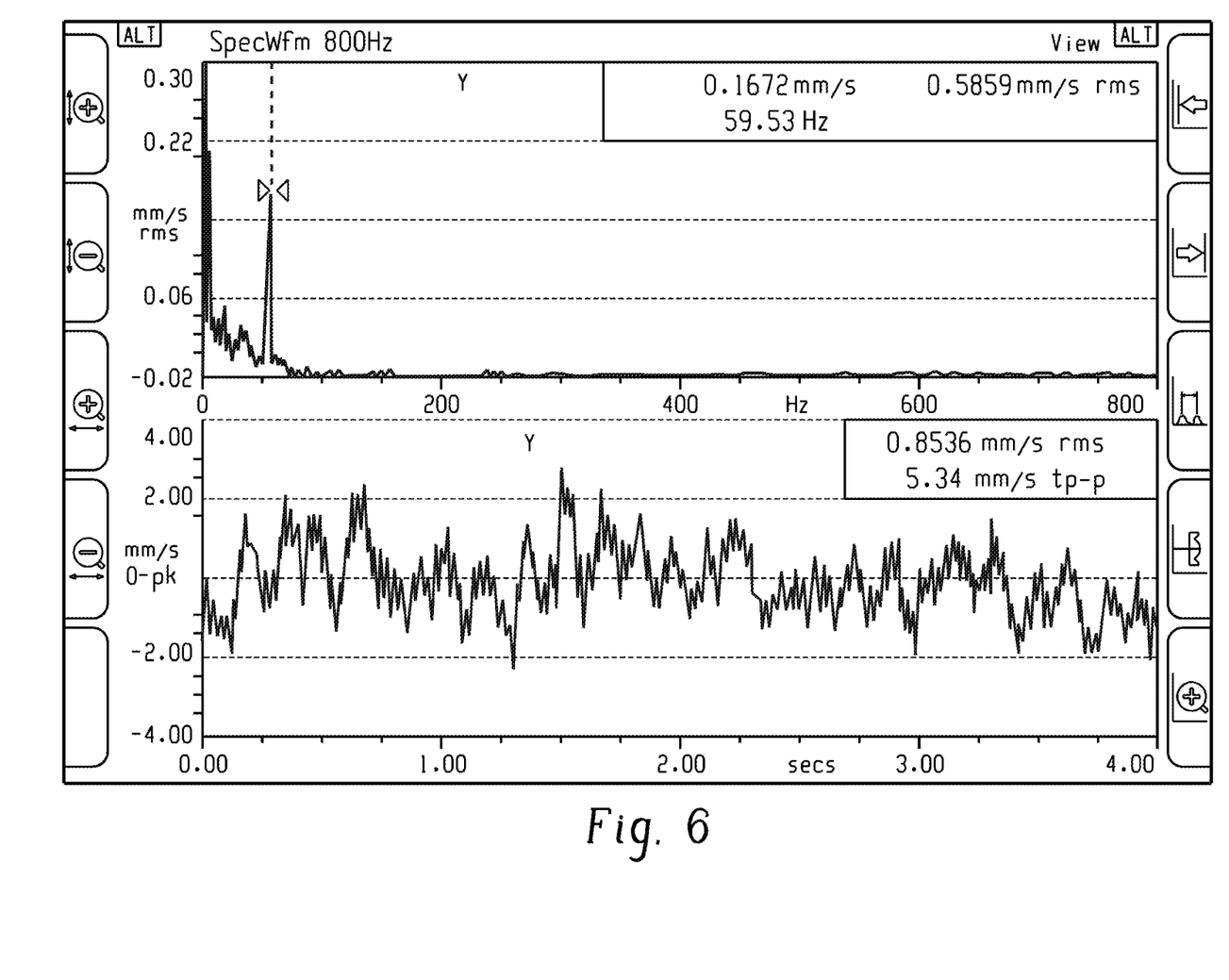
FIG. 6 graphically illustrates rms velocity as a function of frequency and time for the accelerometer mounted directly to the surface of the cryogenic pump of FIG. 5, wherein an insulating block is positioned between the accelerometer and the surface.

As shown in FIGS. 3 and 4, a comparison of room temperature accelerometer measurements produced by the vibration sensor on the calibrated shaker demonstrated no alteration of the signal in the presence and absence of the insulation block. This result indicates that rms velocity as a function of frequency and time is substantially unchanged and that the insulation block did not interfere with signal integrity to the accelerometer. However, when the vibration sensor was used on a cryogenic pump in a cryogenic environment, wherein the skin temperature (i.e., surface) was as low as −256° F., the presence of the insulation block between the accelerometer and the pump resulted in a good signal as shown in FIG. 5 whereas the absence of the insulation block resulted in no usable signal as shown in FIG. 6 even though the accelerometer was cryogenic-rated. Thus, the presence of the insulation block effectively prevented saturation of the signal upon exposure the cryogenic temperature, i.e., the presence of the insulation block prevented electromagnetic perturbations occurring in the accelerometer. Moreover, it is noted that the accelerometer was ground isolated, which did not affect the outcome.

While the disclosure has been described with reference to a preferred embodiment, it will be understood by those skilled in the art that various changes may be made and equivalents may be substituted for elements thereof without departing from the scope of the disclosure. Terms such as first and second as used herein are not intended to imply an order of importance or location, but merely to distinguish between one element and another of like kind. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:

1. A cryogenic-rated vibration sensor comprising:
a cryogenic-rated accelerometer mounted to a top planar surface of an insulation block having a dielectric constant of at least 800 V/mil, wherein the insulation block is configured to be adhesively coupled to a cryogenic pump component such that the cryogenic-rated accelerometer, when in use, is free from direct contact with the cryogenic pump component or includes threaded openings configured to receive studs from the cryogenic-rated accelerometer and the cryogenic pump component or includes studs configured for attachment to the cryogenic-rated accelerometer and the cryogenic pump component.

2. The cryogenic-rated vibration sensor of claim 1, wherein the insulation block is a polytetrafluoroethylene material.

3. The cryogenic-rated vibration sensor of claim 1, wherein the insulation block is a thermoset reinforced plastic comprising a reinforcing substrate and a thermoset resin binder.

4. The cryogenic-rated vibration sensor of claim 3, wherein the reinforcing substrate is selected from the group consisting of woven glass cloth, random glass mat, glass filaments, woven canvas cotton fabric, woven linen cotton fabric, paper, woven aramid fabric, random mat aramid, woven graphite fabric, and random mat graphite and the thermoset resin binder is selected from epoxies, melamines, phenolics, polyesters, and silicones.

5. The cryogenic-rated vibration sensor of claim 1, wherein the insulation block is a glass-cloth reinforced epoxy.

6. The cryogenic-rated vibration sensor of claim 1, wherein the cryogenic-rated accelerometer is a quartz shear-piezoelectric transducer.

7. The cryogenic-rated vibration sensor of claim 1, wherein the insulation block has a thickness greater than 0.1 millimeter.

* * * * *